United States Patent [19]

Cadwallader et al.

[11] Patent Number: 5,004,589

[45] Date of Patent: Apr. 2, 1991

[54] PROCESS FOR PREPARING SODIUM TRIPOLYPHOSPHATE

[75] Inventors: George W. Cadwallader, Maryland Heights; Louis A. Highfill, Union, both of Mo.; Gregory D. Kurdys, Temperance; Richard S. Turigliatto, Southgate, both of Mich.

[73] Assignee: Monsanto Company, St. Louis, Mo.

[21] Appl. No.: 442,968

[22] Filed: Nov. 29, 1989

[51] Int. Cl.$^5$ .................... C01B 15/16; C01B 25/26
[52] U.S. Cl. ..................................... 423/315; 423/305
[58] Field of Search .............................. 423/305, 315

[56] References Cited

U.S. PATENT DOCUMENTS

| | | | |
|---|---|---|---|
| 3,233,967 | 2/1966 | Shen | 423/315 |
| 3,338,671 | 8/1967 | Marshall et al. | 423/315 |
| 3,660,342 | 12/1967 | Pals | 23/293 |
| 3,761,573 | 9/1973 | Hinz et al. | 423/315 |
| 3,932,590 | 1/1976 | Pals et al. | 423/315 |
| 4,790,983 | 12/1988 | Saran | 423/315 |
| 4,800,055 | 1/1989 | Klee et al. | 264/118 |

Primary Examiner—Gregory A. Heller
Attorney, Agent, or Firm—Raymond C. Loyer; Richard H. Shear; James C. Bolding

[57] ABSTRACT

There is disclosed a process from producing granular sodium tripolyphosphate of predetermined particle size by means of calcining sodium orthophosphate dried from water solution and milled to a predetermined particle size. The tripolyphosphate is produced having approximately the same particle size distribution as the orthophosphate feed. Moisturizing the feed prior to calcining increases the assay of the product.

19 Claims, No Drawings

PROCESS FOR PREPARING SODIUM TRIPOLYPHOSPHATE

This invention relates to a process for producing sodium tripolyphosphate by means of calcination of sodium orthophosphate. More particularly, this invention relates to a process for preparing granular sodium tripolyphosphate having predictable, more uniform particle size and which avoids the production of large amounts of less desirable small particle sized material.

BACKGROUND OF THE INVENTION

Granular sodium tripolyphosphate is commonly prepared by first reacting phosphoric acid and a base such as sodium hydroxide or soda ash to provide sodium orthophosphate (orthophosphate). This mixture is then heated to at least about 300° C. and usually between about 300° C. to about 600° C. to form sodium tripolyphosphate (STPP). In many instances a solution of orthophosphate is fed into a spray dryer or rotary kiln dryer to convert the orthophosphate to STPP. Whether STPP is prepared from dried orthophosphate or orthophosphate solutions there is produced STPP in particle size ranges which provide various bulk densities depending on specific conditions. However, common to all processes is the production of undesirable, small sized particles or fractions which are then separated from the desired STPP. Such under-sized particles are generally referred to as "fines". Fines are generally defined as particles less than 100 USS mesh. Such fines are undesirable in a commercial product because these particles cause dust which can irritate nasal membranes, etc., if not separated from the more desirable granular fractions.

Because of the problems caused by fines they are separated from the useful fraction and many attempts have been made to convert such fines into useful products. One such example is found in U.S. Pat. No. 3,160,472 to Metcalf et al whereby the fines are calcined in the presence of at least about 10% of certain blends of alkali metal orthophosphate whereby an appreciable portion of the fines is agglomerated. Another attempt to utilize the fines is found in German Patent DE 3509661 to Klee et al wherein the fines are compacted alone or in admixture with at least one other finely divided washing powder component with a quantity of water required to provide 100% hydration. This material is compacted between rollers, then crushed again to obtain the proper size material followed by removing the under sized and over sized particles.

All of the processes of the prior art create inefficiencies in recycling STPP and do not totally eliminate the production of fines. Large scale production of STPP is common because it has been the material of choice in various detergent applications as a builder in the commonly used built detergent. The tonnage needed to supply this demand causes the production of large amounts of fines. In the production of granular product, excess production of fines leads to a lose of product unless they can be either used or efficiently reprocessed or avoided in the production process. There is needed an efficient method whereby STPP is produced from orthophosphate in particle sizes which largely avoids or greatly reduces the amount of fines produced.

SUMMARY OF THE INVENTION

It has now been discovered that the particle size range of STPP produced by typical calcining of orthophosphate is controlled by first providing dry sodium orthophosphate of predetermined particle size which avoids the production of fines. That is, the particle size of STPP produced is controlled by the particle size of the sodium orthophosphate, in the dry state, fed to a calciner or other means whereby the calcination of orthophosphate to STPP is performed. It has been found that the control of particle size of dry orthophosphate greatly reduces or eliminates the production of fines.

Thus, there is provided in accordance with this invention a process which comprises
1. drying sodium orthophosphate,
2. sizing the dried orthophosphate to a predetermined particle size range, and
3. calcining the dried and sized orthophosphate particles whereby STPP of predetermined particle size is formed.

It has been found that the optimum process also includes the further step of moisturizing the sized orthophosphate prior to its conversion to STPP so as to provide a total water content of from about 2% to about 5% in the orthophosphate feed. The addition of moisture prior to calcining the orthophosphate for conversion to STPP maintains the STPP assay in the desired range of 90% or more.

DETAILED DESCRIPTION OF THE INVENTION

By the process of this invention STPP can be produced having particle sizes which are greater than 100 mesh thereby eliminating the need to reprocess STPP fines. An exemplary size distribution of orthophosphate feed material in approximate weight percent which provides STPP of satisfactory size distribution is as follows: 0–1.95% −7 to +14 mesh; 20–40% −14 to +20 mesh; 15–20% −20 to +30 mesh; 30–45% −30 to +70 mesh; 5–15% −70 to +100 mesh and from 0–5% −100 mesh.

It has been found that the particle size of STPP can be conveniently controlled by employing dried sodium orthophosphate feed material having a predetermined particle size. Typically, the preferred size range of the dried orthophosphate is in the range of −14 to +100 USS mesh. Sizes greater than +14 and smaller than +100 mesh are eliminated from the dried orthophosphate feed. Thus, in accordance with this invention, orthophosphate is sized by crushing and screening to a desired size range or distribution. Of course, over and under sized particles are removed and reused by redissolving such particles in water or agglomerating them for reprocessing. Oversized orthophosphate may be crushed to size and undersized particles from this operation recycled.

In contrast to the inefficient processes for recycling STPP fines and over sized STPP material, recycling of orthophosphate is convenient thereby eliminating any waste of orthophosphate from the orthophosphate drying operation. Typically, no orthophosphate is wasted since it can be agglomerated or redissolved and redried. Thus, by eliminating the waste orthophosphate with respect to particle size and producing STPP of desirable particle size it can be seen that the efficiency of the present process greatly exceeds those known in the prior art.

In the first step of the process of this invention, orthophosphate in water solution is dried by typical means such as drum dryer, spray dryer, etc. Solutions of orthophosphate having a specific gravity of from about 1.56 g/cc to about 1.62 g/cc are provided containing a DSP/MSP ratio of from about 1.8 to about 2.2 where MSP is monosodium phosphate and DSP is disodiam phosphate. After drying, the orthophosphate is crushed and classified by typical means such as multiple screening or wind separation. Larger particles are reduced in size by an attrition mill, rollers or any typical means to reduce particle size of dry material. In each instance, after crushing, the material is classified again such as by screening or by wind separation to remove particles of undesired sizes. The orthophosphate of acceptable particle size from the crushing operations, is combined to provide a feed to the calciner for the production of STPP. Typically, the feed orthphosphate to the calciner contains very little water. In processing the presized orthophosphate the water is removed to permit milling and screening operations providing the particle size distribution desired. The orthophosphate is dried at a temperature in the range of from about 100° C. to about 140° C. Higher drying temperatures, particularly about 170° C., begins to convert the orthophosphate to pyrophosphate which is undesirable.

Moisture in the orthophosphate from the dryer is typically in the range of from about 0.1% to about 0.5% by weight, After combining all of the dried and classified orthophosphate it is preferrably remoisturized prior to being fed to the calciner which produces STPP. Moisturizing by means of water spray on a screw conveyor and other means of transportation is typical. Also, a water spray at the calciner feed or steam addition to the calciner is feasible to moisturize the orthophosphate. Remoisturing can maintain the STPP assay in the desired range of 90% or more.

DESCRIPTION OF THE PREFERRED EMBODIMENTS

A water solution orthophosphate was dried in a drum dryer and classified to provide the sizes and distribution as shown in Table I. Drum drying produces flake-like particles and is preferred. Two tests were performed. In the first test a counter-current calciner was fed with orthophosphate dried to a level of 0.6% water content (no water added) and in the second part additional water was sprayed on the calciner feed to provide an average moisture content of about 2.7% (water added). As can be seen from the data in Table I below, the size distribution of the granular STPP produced is approximately that of the orthophosphate feed material. The data is presented in additive form indicating the cumulative percent of material at each mesh size shown. For example, the presized feed contained 50.5% of material that was retained on the 30 mesh screen. However, the measurement of −100 mesh should be added to the total shown for +100 mesh to obtain the entire content of the samples. The data presented in Table I is an average of 14 separate runs.

TABLE I

| USS MESH | Calciner Feed | No Water Added | Water Added |
|---|---|---|---|
| +14 | 1.6 | 1.6 | 3.1 |
| +20 | 30.5 | 27.2 | 30.7 |

TABLE I-continued

| USS MESH | Calciner Feed | No Water Added | Water Added |
|---|---|---|---|
| +30 | 50.5 | 46.7 | 51.1 |
| +70 | 89.3 | 92.9 | 95.4 |
| +100 | 93.9 | 98.1 | 98.9 |
| −100 | 6.1 | 1.9 | 1.1 |
| TR | | 13.6 | 14.5 |
| Assay | | 89.3 | 90.8 |
| Density | | .69 g/cc | .71 g/cc |
| pH | | 10.11 | 10.09 |
| Turbidity | | 3.0 | 3.2 |

There were produced further samples of granular sodium tripolyphosphate. In this experiment the STPP product temperature was in the range of from about 450° C. in an externally heat rotating calciner. The holding time was 30 minutes. Table 11 shows the sizing of calciner feed and the resulting granular STPP produced from such feed. Unlike Table I, the particle size distribution is shown by independent ranges rather than additive to figures. Bulk density, temperature rise (TR) and pH of a 1% concentration solution is also shown. By the data in Table II it is seen that the sizing properties of the STPP is substantially unchanged whether hydrated or unhydrated orthophosphate feed is calcined and that a higher moisture content in the orthophosphate feed provides higher assay STPP.

TABLE II

| Sizing | Hydrated Orthophosphate | | Unhydrated Orthophosphate | |
|---|---|---|---|---|
| | Feed | STPP | Feed | STPP |
| −7 +14 mesh | .7 | 2.4 | .7 | .8 |
| −14 +20 mesh | 36.3 | 35.2 | 31.6 | 29.5 |
| −30 +30 mesh | 17.6 | 16.6 | 16.8 | 16.27 |
| −30 +70 mesh | 35.2 | 40.2 | 38.8 | 40.8 |
| −70 +100 mesh | 9.5 | 4.8 | 11.1 | 6.7 |
| −100 | .6 | .7 | 1.0 | 5.9 |
| Feed water % | 3.4 | | .13 | |
| Calcination Temp. °C. (max.) | | 451.7 | | 449.8 |
| Bulk Density (g/cc) | | .56 | | .57 |
| Frangibility % | | 4.0 | | 2.2 |
| TR | | 7.5 | | 7.2 |
| pH | | 10.16 | | 10.13 |
| Assay | | 90.2 | | 87.9 |

In a preferred embodiment moisturized, presized orthophosphate is calcined and cooled then subjected to a separation process which removes oversized material. It has been found that removal of oversized material is the only treatment needed subsequent to cooling for obtaining satisfactory granular STPP. In this embodiment the oversized material may be remilled to reduce the size of the particles and when so reduced subjected to screening or wind separation of undersized orthophosphate, then combined with the satisfactory product from the oversized screening operation. Typical screening operations are employed and in commercial equipment screening may be performed with commercially available apparatus sold under the tradename Rotex screens to remove large particle sizes. Wind separators may be employed to remove undersized orthophosphate from the orthophosphate obtained by remilling the oversized particles.

There has thus been described processes for obtaining satisfactory granular STPP without the production of fines or with the production of very small amounts STPP of fines compared to the prior art. Previously, granular STPP has been prepared commercially with only 65 to 75% acceptable particle size providing from 25% to 35% fines which were then either reprocessed or discarded as waste. By the process of this invention the presized orthophosphate produces approximately the same amount of undersized material but such undersized material may be reprocessed by simply redissolving it in water for further drying to provide presized orthophosphate feed material to the calciner. It has been found that very small amounts of STPP fines are obtained in the present process. Such fines are usually obtained only by milling oversized STPP particles which constitute a very small fraction of the total STPP produced as can be seen from the data in the above Tables I and II.

The optimum process for converting orthophosphate to granular STPP in accordance with this invention is a countercurrent calciner wherein the orthophosphate feed enters the calciner at the cooler end and exits from the relatively hotter end. It is noted that cocurrent calciners permit extended travel at higher temperatures thereby creating agglomerates which change the particle size distribution from that being fed to the calciner. However, the amount of change can be considered when presizing the orthophosphate feed so as to produce granular STPP by predetermined particle size.

What is claimed:

1. A process for preparing granular sodium tripolyphosphate which comprises:
   (a) drying a solution of sodium orthophosphate,
   (b) sizing said dried orthophosphate to a predetermined particle size, whereby at least about 95%, by weight, has a particle size of from $-14$ mesh to about $+100$ mesh, and
   (c) calcining the dried, sized orthophosphate whereby sodium tripolyphosphate is formed having the size distribution approximately that of the orthophosphate feed material.

2. A process for preparing granular sodium tripolyphosphate wherein from about 88% to about 92%, by weight, of the particles are within the size range of from about in its place 14 mesh to about $+100$ mesh which comprises:
   (1) drying sodium orthophosphate,
   (2) sizing said dried orthophosphate whereby at least about 90% by weight, has a particle size in the range of from $+14$ mesh to about $+100$ mesh, and
   (3) calcining the dried sized orthophosphate in a countercurrent calciner whereby said sodium tripolyphosphate is formed.

3. The process of claim 1 further including the step of moisturing the sized orthophosphate prior to feeding it to the calciner to provide a total water content of from about 2% to about 5%, by weight.

4. The process of claim 1 further including the step of redissolving the undersized orthophosphate obtained by the presizing operation and drying the solution.

5. The process of claim 1 wherein the sodium tripolyphosphate is classified to remove particles larger than desired.

6. The process of claim 1 wherein the orthophosphate is dried from a water solution having a specific gravity in the range of from about 1.56 g/cc to about 1.62 g/cc.

7. The process of claim 1 wherein the sodium tripolyphosphate produced has a density in the range of from about 0.5 g/cc to about 0.9 g/cc.

8. The process of claim 6 wherein the orthophosphate is dried at a temperature in the range of from about 70° C. to about 140° C.

9. The process of claim 1 wherein the orthophosphate feed to the calciner contains a particle size distribution by weight, as follows: from 0 to 1.95% $-7$ to $+14$ mesh, 20 to 40% $-14$ to $+20$ mesh, from 15 to 20% $-20$ to $+30$ mesh, from 30 to 45% $-30$ to $+70$ mesh, from 5 to 15% $-70$ to $+100$ mesh and from 0 to 5% $-100$ mesh.

10. The process of claim 2 further including the step of moisturizing the sized orthophosphate prior to feeding it to the calciner to provide a total water content of from about 2% to about 5%, by weight.

11. The process of claim 2 further including the step of redissolving the orthophosphate fines obtained from the sizing step and drying the solution for reuse in said process.

12. The process of claim 11 further including the step of removing the portion of sodium tripolyphosphate larger than $+14$ mesh reducing the size thereof to the range of from $+14$ mesh to $+100$ mesh and recombining such particles with STPP of similar size.

13. The process of claim 1 wherein the orthophosphate calciner feed is sized to provide a feed having a maximum of 2%, by weight, $+14$ mesh particles and a maximum of 10%, by weight $-100$ mesh particles.

14. The process of claim 1 wherein the orthophosphate solution is dried by means of a drum dryer whereby flakes of sodium orthohphosphate are formed.

15. The process of claim 1 wherein the calciner is a countercurrent calciner.

16. The process of claim 2 wherein the sodium tripolyphosphate has a density of from about 0.5 to about 0.9 g/cc.

17. The process of claim 1 wherein the amount of fines produced in the sodium tripolyphosphate is less than about 2% by weight.

18. The process of claim 1 wherein the orthophosphate is sized to have a maximum of 2%, by weight, $+14$ mesh and a maximum of about 10%, by weight, $-100$ mesh.

19. The process of claim 1 wherein the orthophosphate is dried on a drum dryer to provide flakes of orthophosphate.

* * * * *